United States Patent [19]

Shenk

[11] 4,317,624
[45] Mar. 2, 1982

[54] STROBE CAMERA HAVING RANGE CORRELATED SCANNING BLADE ENDODING

[75] Inventor: Edwin K. Shenk, Westford, Mass.
[73] Assignee: Polaroid Corporation, Cambridge, Mass.
[21] Appl. No.: 203,125
[22] Filed: Nov. 3, 1980
[51] Int. Cl.³ .................................... G03B 15/03
[52] U.S. Cl. ......................... 354/139; 354/23 D; 354/60 F; 354/195
[58] Field of Search ............. 354/23 D, 27, 29, 33, 354/34, 60 F, 139, 195, 127

[56] References Cited

U.S. PATENT DOCUMENTS

| | | | |
|---|---|---|---|
| 3,478,660 | 11/1969 | Land | |
| 3,794,422 | 2/1974 | Chitayat | |
| 4,047,190 | 9/1977 | Johnson et al. | 354/27 |
| 4,053,907 | 10/1977 | Iwata et al. | 354/29 |
| 4,188,103 | 2/1980 | Biber et al. | 354/27 |
| 4,199,244 | 4/1980 | Shenk | 354/195 |

Primary Examiner—Russell E. Adams
Attorney, Agent, or Firm—David R. Thornton

[57] ABSTRACT

A flash camera having a range finder, a blade position sensor for producing an output representative of the position of the displaceable blades of a scanning shutter, a flash firing apparatus that includes a position/distance converter responsive to the output of the range finder for producing a representation of the desired flash-fire position of the blades, and a coincidence detector responsive to the output of the blade position sensor for firing the flash unit when the blades reach the position at which the exposure aperture established by the blades will effect proper flash exposure of the subject. In one embodiment of the invention, the converter is in the form of a digital memory whose addresses represent subject distances and whose contents at a given address represents the fire-flash position for the distance specified by the given address. In a second embodiment of the invention, the fire-flash position is generated from a scaled clock.

14 Claims, 9 Drawing Figures

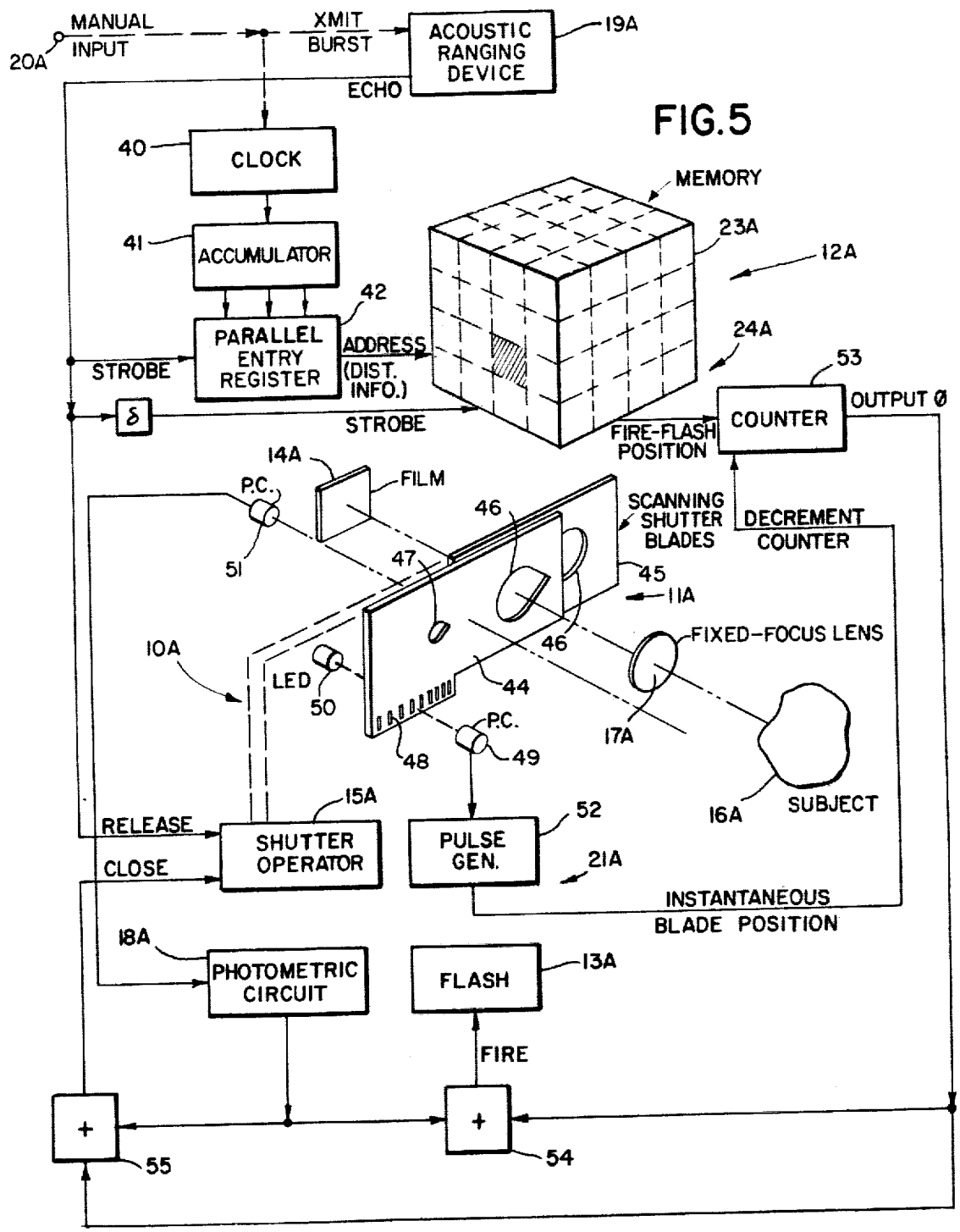

STROBE CAMERA HAVING RANGE CORRELATED SCANNING BLADE ENDODING

TECHNICAL FIELD

This invention relates to an improved method of and apparatus for flash photography and more particularly to a method of and apparatus for actuating a camera flash unit when the exposure aperture established by a scanning shutter has an area that is functionally related to the distance of the subject being photographed.

BACKGROUND OF THE INVENTION

As is well known, the brightness of a subject illuminated by a flash unit on a camera varies inversely as the square of the distance of the subject from the flash. If the aperture area of a shutter is selected such that it is related to the distance of the subject to the flash by the inverse of the relationship between brightness and distance (i.e., directly as the square of the distance), then under conditions of negligible ambient light, a predetermined amount of light will pass through the exposure aperture independently of subject distance. By properly selecting the parameters of flash intensity and aperture area, the predetermined amount of light passing through the exposure aperture will properly expose a sheet of film located behind the shutter.

If subject distance is measured in a manner that is directly related to time (e.g., by using an ultrasonic range finder), then the brightness of a subject due to flash illumination will be a parametric function of time (i.e., will vary inversely as the square of time). Furthermore, if a scanning shutter is utilized such that the exposure aperture established by the shutter varies directly as the square of time measured from first light, then the product, at any instant, of the aperture area and the brightness of the subject due to its flash illumination will be a constant. By providing apparatus that fires the flash subsequent to first light after a period of time proportional to subject distance, the exposure aperture at the instant of firing of the flash will have an area such that the amount of light reflected from the subject due to its illumination by the flash and passing through the aperture will properly expose the film, provided only that negligible ambient light is present.

Apparatus described above is disclosed in U.S. Pat. No. 4,188,103. Such apparatus relies on a scanning shutter whose aperture size follows what is termed a time-squared program. Upon actuation of this shutter, the exposure aperture increases as the square of time measured from first light, and the output of an ultrasonic rangefinder fires the flash after a lapse of a period of time subsequent to first light which is directly proportional to the distance of the subject determined by the rangefinder. Under conditions of flash illumination (i.e., no significant ambient light) the amount of light which is reflected from the subject due to its illumination by the flash and which passes through the exposure aperture will be independent of subject range enabling a proper exposure to be made each time the shutter is actuated regardless of subject distance up to the maximum distance at which the flash is effective.

This technique is effective as long as the shutter follows a time-squared program. If the program of a given shutter varies from actuation to actuation, then erratic exposures will result. In addition, the configuration of the apertures of the overlying displaceable blades of the scanning shutter is critical. Under some conditions, it is not possible to design the apertures of a scanning shutter with a time-squared program such that the shape of the exposure aperture is optimum.

It is therefore an object of the present invention to provide a new and improved method of and apparatus for actuating a flash unit on a camera utilizing a scanning shutter to achieve optimum exposure wherein the results are independent of the program of the scanning shutter thus permitting optimal shaping of the aperture area throughout the program.

BRIEF DESCRIPTION OF THE INVENTION

In accordance with the present invention, a blade position sensor is provided for producing an output representative of the position of the overlying and displaceable apertured blades of a scanning shutter in response to their displacement. Such output, together with the output of a rangefinder representative of the range of the subject being photographed, is applied to flash actuating apparatus for firing the flash unit. Means are provided for converting one of these outputs to a converted output relating the nonlinear function of what is termed, hereinafter, the "fire-flash" aperture (the correct exposure aperture for proper flash contribution) to the distance specified by the range finder. The other function of the flash actuating apparatus is to determine when the instantaneous position of the blades as they are displaced in response to the shutter actuation (as represented by the output of the blade position sensor) reaches the fire-flash position. When coincidence is detected, the flash is fired.

In one embodiment, the apparatus includes a position/distance converter and a coincidence detector. The position/distance converter is responsive to the output of the ranging device for producing a representation of the fire-flash position of the blades. The coincidence detector is responsive to the output of the blade position sensor, which provides the instantaneous blade position, and to the representation of the fire-flash position of the blades for actuating the flash unit when the blades reach said fire-flash position.

The blade position sensor provides feedback information on the position of the blades of the scanning shutter as they scan, such position being compared using the coincidence detector with the fire-flash position represented by the output of the position/distance converter. In one embodiment of the invention, the position/distance converter includes a digital memory whose contents, at a given address corresponding to a given subject distance, represents the fire-flash position of the blades for a subject at the given distance. In this embodiment of the invention, the output of the ranging device addresses the digital memory. Thus, the address of the memory is determined by the distance of the subject and the contents of the memory at that address is the location of the blades at which proper flash exposure will be achieved. Means are also provided for transferring the contents of the memory at the address specified by the output of the ranging device into a preset counter permitting the contents of the counter to be compared with the instantaneous position of the blades of the scanning shutter as determined by the blade position sensor.

The preferred form of the coincidence detector, which determines the instant at which the shutter blades are at the position specified by the contents of the preset counter, involves a pulse generator triggered by each output of the blade position sensor so as to produce a train of pulses that decrement the preset counter. When the contents of this counter reach zero, an output is produced which fires the flash.

The camera according to the present invention may also include a photometric system correlated with the exposure aperture established by the scanning shutter and producing an output when the amount of light incident on the film reaches a predetermined limit. The selected flash-fire aperture can also be adjusted in accordance with the level of ambient light to produce fill-in flash exposures.

In a second embodiment of the invention, the position/distance converter includes a scaled clock for generating from the range signal a train of pulses having a nonuniform repetition rate such that the total number of pulses produced after a period of time proportional to the distance of the subject to the flash is representative of the desired fire-flash position of the blade. By accumulating the output of the scaled clock in an accumulator, and strobing the accumulator to transfer its contents into a parallel entry register upon receipt of an echo from the acoustic ranging device, the contents of the parallel entry register can be numerically compared with a pulse train generated upon displacement of the blades of the scanning shutter via the output of the glade position sensor. When coincidence occurs, the flash is actuated. In another embodiment of the invention, the scanning shutter is provided with non-linearly spaced slits or marks arranged to convert the representation of incremental blade displacement in accordance with the function relating the flash-fire aperture to subject distance so as to provide a blade position count directly comparable to a linear count representing subject distance.

BRIEF DESCRIPTION OF THE DRAWINGS

Embodiments of the present invention are disclosed in the accompanying drawings wherein:

FIG. 5 is a block diagram of a specific embodiment of the present invention utilizing a digital memory;

DETAILED DESCRIPTION

Figure 1:
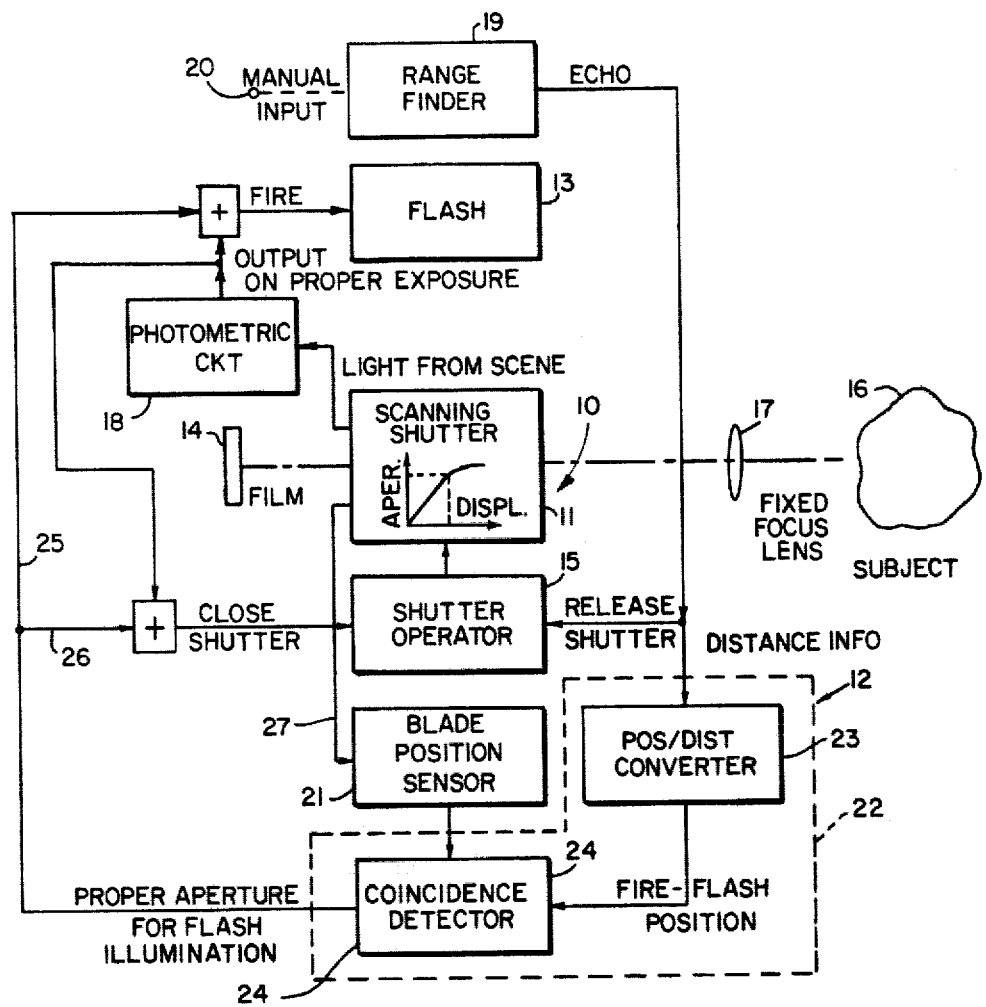
FIG. 1 is a block diagram of the general form of apparatus according to the present invention for actuating a flash unit on a camera with a scanning shutter in order to optimize exposure.

Referring now to FIG. 1 of the drawings, reference numeral 10 designates a camera having scanning shutter 11 and incorporating flash firing apparatus 12 in accordance with the present invention for actuating flash unit 13 in such a way that exposure of film 14 is optimized.

Scanning shutter 11 is of the type having displaceable apertured blades (see reference numeral 11A in FIG. 5) each of which is displaceable in opposite directions relative to the other. When the shutter is actuated by shutter operator 15, the blades are positively displaced to open so that the projection of the aperture in one of the blades on the aperture in the other of the blades establishes an exposure aperture or aperture value that initially increases with time subsequent to actuation of the shutter. When the shutter is deactuated the blades are negatively displaced to close so that the exposure aperture eventually decreases to zero. This type of shutter is entirely conventional in nature and is disclosed in detail, for example, in U.S. Pat. No. 3,570,381 and U.S. Pat. No. 4,020,497.

As soon as first light occurs, which is to say, that the exposure aperture comes into existence, light from subject 16 is directed by fixed focus lens 17 through the exposure aperture and onto film 14.

Usually, camera 10 also includes photometric system 18 correlated with the exposure aperture established by the shutter and producing an output when the amount of light passing through the exposure aperture reaches a predetermined limit. The photometric system is conventional in nature and is effective when ambient light exceeds a threshhold for obtaining a properly exposed photograph of subject 16 on film 14 without necessarily utilizing flash 13. Additionally, the photometric system may also be utilized to vary the selected flash-fire aperture in accordance with the ambient light level. Hence, the flash 13 (which may be electronic of incandescent system) will, when the ambient light exceeds a threshhold level, serve in a "fill-flash" role.

In this arrangement flash 13 will be effective to obtain a properly exposed photograph of subject 16 whenever the subject is within the range of the flash, i.e., within 10–12 feet of the camera. To accomplish the latter, apparatus 12 requires information on the distance of the subject; and to this end, the camera is provided with a ranging means or range-finding system 19 such as an ultrasonic ranging device similar to that disclosed in U.S. Pat. No. 4,199,246. Such a ranging system is responsive to a manual input (designated by reference numeral 20) for producing an ultrasonic burst which is reflected by subject 16 back to the range finder 19 which produces an echo pulse after a period of time, subsequent to the transmission of the ultrasonic burst, directly proportional to the distance of the subject from the camera. For a subject about 10 feet from the camera, the echo pulse would be received about 20 msec following transmission of the ultrasonic burst assuming that the environment is at room temperature.

While an ultrasonic ranging system is preferred, the invention does not directly depend upon the use of such a system. All that is required of the rangefinder is production of an output representative of the distance from the flash unit to the subject being photographed. For example, the output could be a physical displacement produced by an optical range finder instead of a period of time produced by an ultrasonic rangefinding system.

In general, shutter operator 15 is responsive to an output from the range finder 19 that indicates completion of the rangefinding operation for actuating shutter 11 thereby positively displacing the blades such that an exposure aperture is established and increases with time. Flash firing apparatus 12, according to the present invention, is constructed and arranged so as to actuate flash 13 when the exposure aperture has an area functionally related to the distance of subject 16 from the camera. This general result achieved with apparatus 12 is the same as that achieved with the apparatus disclosed in U.S. Pat. No. 4,188,103 referred to above. As explained in that patent, a relatively short burst of light will be reflected from the subject due to the output of the flash and this will properly expose the film if the exposure aperture at the instant the flash is fired has an area related to the square of the distance of the subject from the camera. In the patent just referred to, this condition is met by providing a range time interval in conjunction with a time-squared shutter program.

Unlike the above, apparatus 12 does not rely upon prediction of the time variation in exposure aperture for optimizing the exposure. Rather, apparatus 12 according to the present invention provides a blade position sensor 21 and flash actuating means 22 which utilizes feedback information generated by the output of blade sensor 21 for firing the flash at a selected aperture value. Sensor 21 is responsive to displacement of the blades of the scanning shutter when they move in a direction in which the exposure aperture increases for producing an output that is representative of the instantaneous position of the blades. Flash actuating means 22, on the other hand, actuates flash 13 in response to a comparison of the output of rangefinder 19 (which is representative of the distance of the subject to the camera) and to the output of the sensor 21.

Flash actuating means 22 comprises position/distance converter 23 and coincidence detector 24. Converter 23 is responsive to the output of range finder 19 (which is a measure of the distance of the subject to the camera) for producing a representation of what is termed hereinafter the "fire-flash" position of the blades of the scanning shutter. The fire-flash position of the blades for a subject at a given distance designates the position of the blades at which the exposure aperture established by the blades has an area that will effect proper flash exposure of the subject on film 14 when the subject is at the given distance.

Coincidence detector 24 is responsive to the output of sensor 21 (i.e., to the instantaneous position of the blades) and to the representation of the fire-flash position of the blades provided by converter 23. When coincidence detector 24 determines that the instantaneous position of the blades corresponds to their fire-flash position, the detector 24 produces an output indicating that the exposure aperture is of proper area for achieving an optimum flash exposure. Thus, the output of detector 24 is utilized for firing-flash 13 via line 25 and to deactuate shutter 11 via a signal in line 26 which is applied to shutter operator 15.

The above description of apparatus 12 demonstrates the difference over the apparatus disclosed in U.S. Pat. No. 4,188,103. In the present invention, sensor 21 provides feedback information via line 27 on the actual position of the blades of a scanning shutter as they scan. The actual, instantaneous position of the blades is compared in detector 24 with the fire-flash position represented by the output of converter 23. By reason of this approach, proper film exposure is achieved independently of the time program of the scanning shutter, i.e., independently of the manner in which the exposure aperture area of the scanning shutter changes with time.

Hence, as is developed in more detail below, the range finder 19 provides ranging means for producing an output representative of subject distance, the blade position sensor 21 in conjunction with blade markings provides means for detecting each progressive position of one of the blades and for producing a blade position signal related thereto, and the flash actuating means 24 provides converter means 23 for converting the blade position output in accordance with the function of the flash-fire aperture versus subject distance to a converted signal, means for comparing the latter to the range output, and means, such as coincidence detector 24, for producing a flash trigger signal in accordance with such comparison.

While the present invention is herein described with regard to a fixed focus type camera. It should be understood that the ranging provided by rangefinder 19, if desired, could also be utilized for the purpose of adjusting the lens mount of the camera for the purpose of establishing a precise focus.

Figure 2:
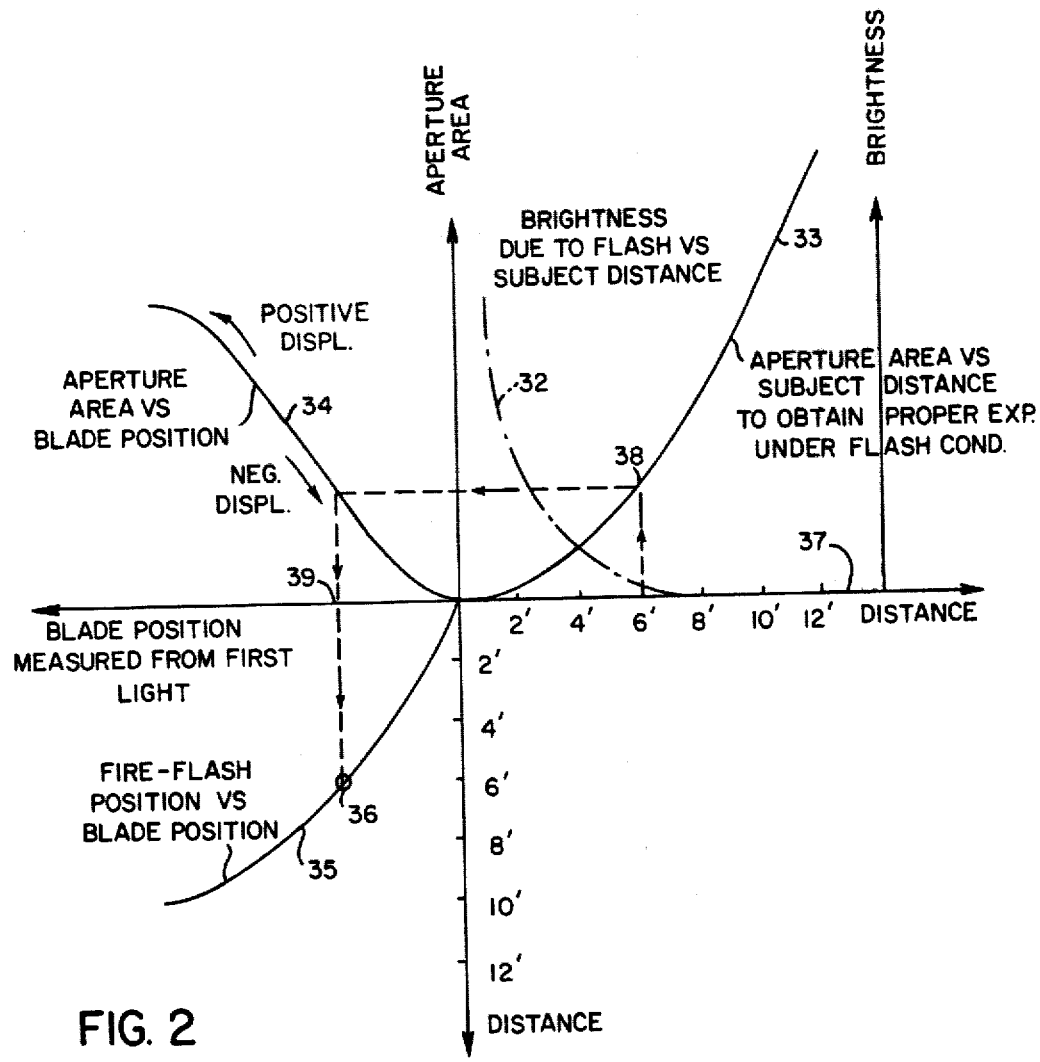
FIG. 2 is a composite plot indicating how the curve representing blade position as a function of distance to obtain proper exposure under flash conditions (fire-flash curve) can be obtained from curves representing aperture area as a function of distance and aperture area as a function of blade displacement.

Converter 23 of flash actuating apparatus 22 serves the purpose of converting subject distance information to the fire-flash characteristic curve for the camera system involved. For purposes of illustration, the curve represents blade displacement of the scanning shutter as a function of subject distance under the conditions that essentially all of the light entering the exposure aperture is due to light furnished by the flash and reflected from the subject, and that the light passing through the exposure aperture achieves proper exposure. The fire-flash characteristic curve can be obtained empirically by utilizing an actual scanning shutter under predetermined or preestablished ambient conditions, or analytically assuming the shape of the variation in aperture area with distance which will provide proper exposure. If the "room effect" is minimal, i.e., there are no light reflecting walls in the vicinity of the flash to alter the light incidence on a subject when a flash is fired, then the brightness of the subject, due to the flash, will follow an inverse square relationship with distance. This relationship is illustrated in FIG. 2 by reference numeral 32. An exposure aperture whose area varies as the square of subject distance, when used with the flash, will result in the same amount of light passing through the exposure aperture regardless of the distance of the subject from the camera. Such a relationship between area and distances is indicated in FIG. 2 by curve 33 which is the inverse of curve 32. If the "room effect" is taken into consideration, then curves 32 and 33 will have a somewhat different shape.

Associated with a given scanning shutter is an aperture area/blade position curve, such as indicated in FIG. 2, by reference numeral 34. Given curves 33 and 34, the fire-flash position response of the scanning shutter can be determined in the manner indicated by dash lines in FIG. 2. Point 36 on fire-flash characteristic curve 35 is obtained, for example, by selecting an arbitrary distance on distance scale 37, determining the aperture area for that distance from curve 33, as indicated by intersection 38; and then determining the blade position or displacement to provide that aperture which is indicated at 39. With this blade displacement position and with the arbitrarily chosen distance, point 36 is defined.

Preferably, curve 35 is obtained experimentally under what might be termed an average "room effect" condition on a point-by-point basis. To obtain a point on curve 35, the scanning shutter is manipulated until a predetermined aperture area is established under static conditions. For example, the aperture may be opened in a darkened environment and successive frames exposed under flash at different subject distances. Once the most satisfactory frame or photograph is selected, since the blade position and subject distance is known for that frame, a point on curve 35 is established. The process is then repeated for different aperture values to provide a plurality of points so as to establish the complete curve.

Figure 8:
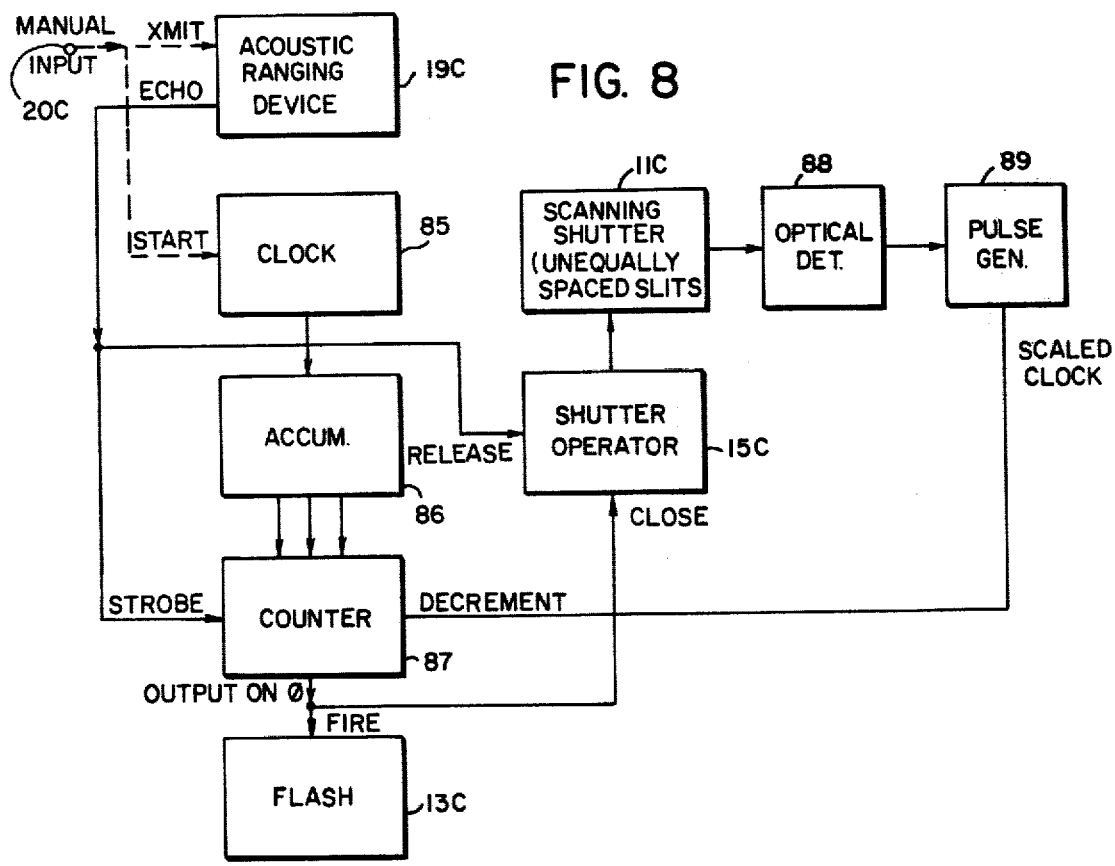
FIG. 8 is a block diagram of a further embodiment of the present invention in which a scaled clock is developed by the blades.
Figure 6:
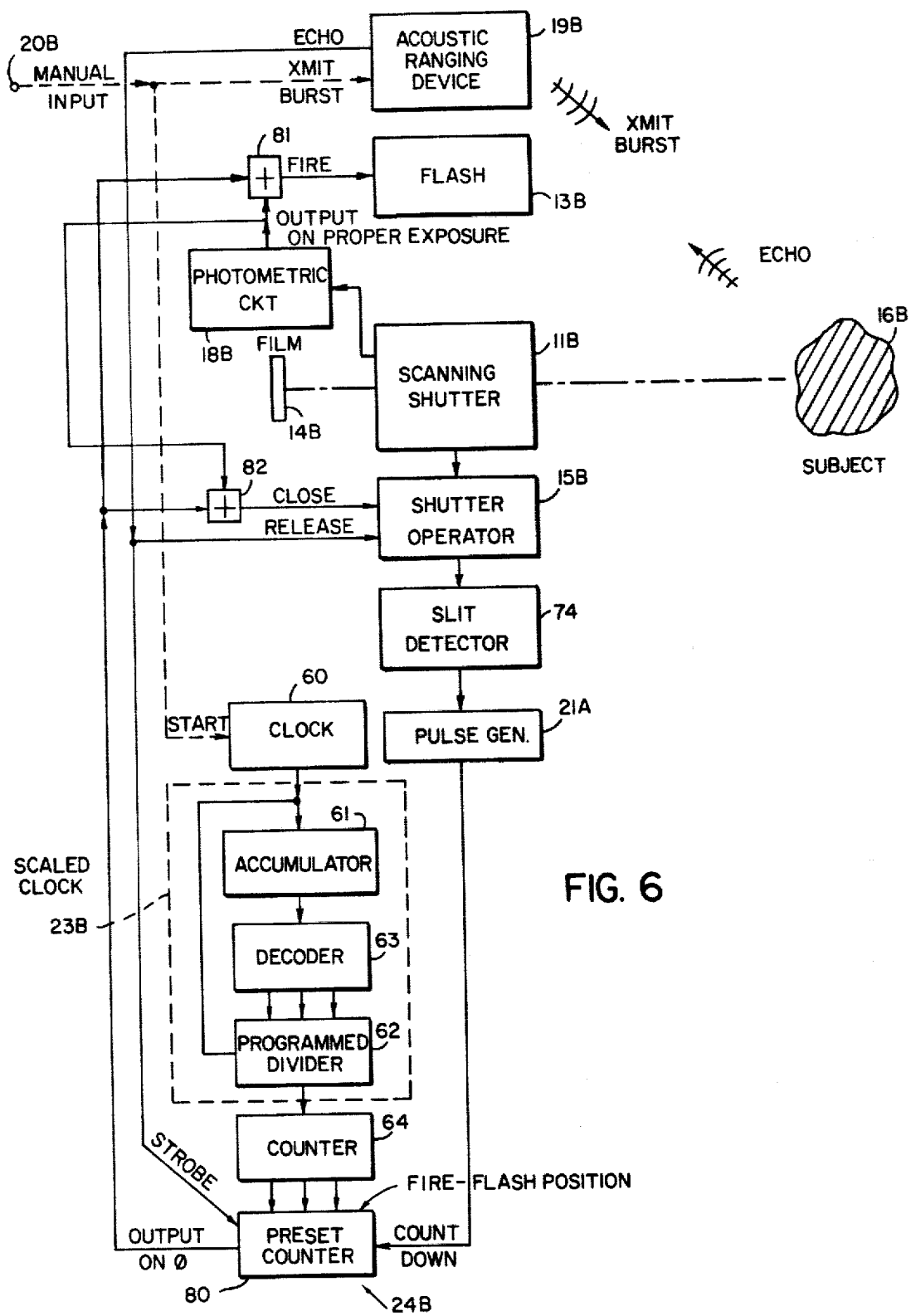
FIG. 6 is a block diagram of another embodiment of the invention in which a scaled clock is utilized as part of a position/distance converter.

Once the entire curve 35 is obtained, converter 23 can be created. Different examples of converter 23 are shown in FIGS. 6 and 8 and will be described later.

Figure 3:
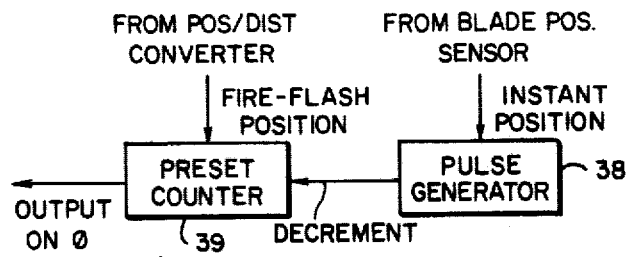
FIG. 3 is a block diagram of one type of coincidence detector that can be utilized with the device shown in FIG. 1.
Figure 4:
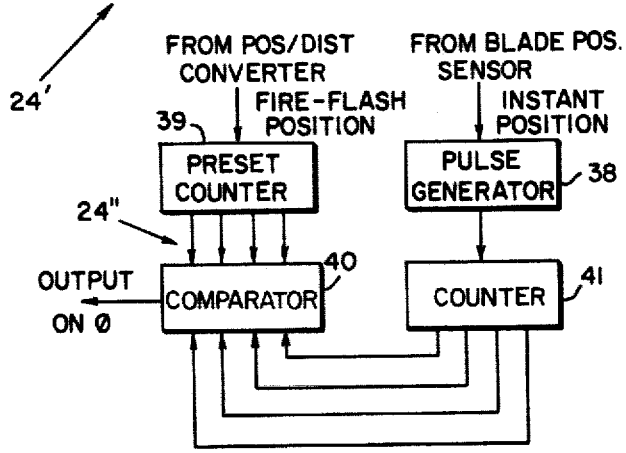
FIG. 4 is a second embodiment of a coincidence detector.

With regard to coincidence detector 24, it may have various configurations, two of which are shown in FIGS. 3 and 4. In FIG. 3, coincidence detector 24' comprises pulse generator 38 and preset counter 39. Counter 39 is preset with the fire-flash position obtained from converter 23. The instantaneous position of the blades of the scanning shutter is derived from sensor 21 and applied to pulse generator 38.

The output of pulse generator 38 is a train of pulses that decrements counter 39. When the contents of this counter, which originally contained the fire-flash position, reaches zero, the counter produces an output $\phi$ which is used, as seen in FIG. 1, to fire flash 13 and signal shutter operator 15 to close the scanning shutter.

An alternative configuration for the coincidence detector is shown in FIG. 4, wherein detector 24" comprises comparator 40 and counter 41 in addition to pulse generator 38 and preset counter 39. After the fire-flash position is strobed into preset counter 39, and the scanning shutter is actuated, movement of the blades produces the instantaneous blade position which is applied to pulse generator 38 as in the case of detector 24' shown in FIG. 3. In detector 24", however, pulse generator 38 is applied to counter 41 which accumulates the pulses produced by generator 38 such that the contents of counter 41 represents the physical position of the blades. The contents of the preset counter 39 represents the fire-flash position; and the contents of counters 39 and 41 are compared by comparator 40 which produces an output when the contents of counters 39 and 41 are equal. The output, as indicated above, is used for the purpose of firing the flash and closing the shutter.

A specific detailed embodiment of the present invention is shown in FIG. 5 to which reference is now made. In camera 10A shown in FIG. 6, position/distance converter 23A is in the form of a digital memory, whose contents, at a given address corresponding to a given subject distance, represent the fire-flash position of the blades for a subject at the given distance. In FIG. 5, memory 23A is shown as a 4×4 matrix of 4-cell registers for illustrative purposes only. If the camera is to have a flash range of from, say, 2 feet to 14 feet, then a 4×4 memory would permit the 12 foot range to be divided into 16 steps each of which is represented by an address in the memory. The 4-cell arrangement of the registers permits the fire-flash position to be expressed as one of 16 possible locations occupied by the blades between first light and maximum aperture. It should be understood, however, that memory 23A is merely symbolic of the principles involved in the present invention; and the actual size of the memory will depend upon how finely the subject distance and blade displacement positions are to be divided.

In the operation of camera 10A, when an operator wishes to photograph subject 16A on film 14A, manual input 20A is initiated causing acoustic ranging device 19A to produce an ultrasonic burst that travels toward the subject and is reflected thereby back to a transducer (not shown) at device 19A. Coincident with transmission of the burst, clock 40 associated with device 19A is activated producing a train of clock pulses that are accumulated in accumulator 41. Upon receipt of an echo, device 19A produces an echo signal that strobes the contents of accumulator 41 into parallel entry register 42. Thus, upon receipt of an echo from the subject, the contents of parallel entry register 42 is a number directly related to the distance of the subject from the camera. It is also the address of the memory whose contents will provide the fire-flash position of scanning shutter 11A for a subject at the distance determined by device 19A.

Simultaneously with strobing the accumulator 41 into register 42, shutter operator 15A is triggered causing mechanical linkage 43 to actuate scanning shutter 11A which comprises a pair of overlying, displaceable blades 44, 45. Each of the blades is provided with an exposure aperture 46 which, when the shutter is in its pre-exposure inactive state, overlies a solid portion of the other blade thus blocking scene light from film 14A. Each blade is also provided with a photocell aperture 47. Finally, at least one of the blades is provided with a series of apertures or slits 48 which are cooperable with photocell 49 and LED 50.

A very short period of time after the contents of accumulator 41 is strobed into register 42 and memory 23A is addressed, and before blades 44, 45 can begin to move, the contents of the addressed register in the memory is strobed into counter 53. In FIG. 5, the addressed register is shown by cross-hatched lines. Thus, counter 53 contains the fire-flash position of scanning shutter 11A just prior to initial movement of the blades of the shutter. The slight delay in strobing the contents of the memory into register 53 is provided in order to permit the proper addressing of the memory, but the delay is so short in terms of the mechanical movement of the blades that register 53 contains the fire-flash position before the blades actually move.

When shutter 11A is in its pre-exposure state, apertures 46 and 47 in the blades are misaligned and no light from the subject can pass lens 17A. When operator 15A is triggered, thereby actuating shutter 11A, blades 44 and 45 are displaced in opposite directions. When the projected area of aperture 46 in one blade first begins to overlie the aperture in the other blade, first light occurs, or that is, scene light begins to pass to the film 14A. Just prior to first light through the exposure apertures 46, photocell apertures 47 in the blades begin to overlie with the result that light from the scene is also incident on photocell 51 which drives photometric circuit 18A. A capacitor (not shown) in the photometric circuit thereupon begins to charge towards a threshold level in accordance with the output of photocell 51 which depends on the brightness of the scene.

At first light, photocell 49 detects LED 50 by reason of the first of slits 48. The output of photocell 49 drives pulse generator 52 which produces, for each slit, at least one pulse which decrements counter 53.

When the instantaneous blade position given by the pulses produced by generator 52 reduces the contents of counter 53 to zero, this counter produces an output φ that is applied to OR-gates 54 and 55. OR-gate 54 passes the output of counter 53 and fires flash 13A, while OR-gate 55 passes the output and triggers operator 15A causing the latter to close shutter 11A. At this time, the exposure aperture value formed by cooperating apertures 46 on the blades will have an area appropriate for achieving proper exposure of the subject assuming that negligible ambient light is present. Photometric circuit 18A, under this condition, is not effective to produce an output and thus does not contribute to the operation of the system.

In this embodiment, when ambient light is greater than a threshold level such that the capacitor in photometric circuit 18A reaches a threshold level before receipt of an echo by the ranging device, photometric circuit 18A produces an output that passes through OR-gates 54 and 55 (before counter 53 reaches zero) thereby firing flash 13A and triggering operator 15A. Under this condition, the exposure aperture is smaller than its value at the previously noted fire-flash position so that fill-in flash is effective to lighten shadows that may be present under strong ambient lighting conditions. Other arrangements for modifying the flash fire value proportional to the ambient light level, although not shown, are also contemplated. For example, for the above described embodiment, the camera could be modified to preevaluate the light level and add or subtract pulses to the ranging system to thereby alter the address of memory 23A and thus the selected flash fire aperture. In a somewhat similar manner, pulse counts could be added or subtracted from the converted count or the blade position count.

While a plurality of individual apertures or slits 48 are shown in FIG. 5 in association with photocell 49 and LED 50 for the purpose of detecting and providing feedback information on the position of the shutter blades as they move towards their maximum open position, various expedients can be used. For example, the leading and trailing edges of a slit may be detected so as to increase the resolution of the system by doubling the number of pulses produced for a given displacement of the blades. Alternative to this arrangement is the provision of a reflective rather than a "see-through" system. In such case, an optical stripe could be provided on the blade. As a further alternative arrangement, a magnetic stripe may be applied to the blade and a pick-up head can be operatively associated with the stripe for the purpose of detecting the position of the blade. Finally, regularly located serations could be applied to the blade and a magnetic pick-up utilized.

In this arrangement, the blade position sensor is operative over the initial portion of the exposure internal from first light while progressively enlarging apertures are being formed. However, the system can also be modified so as to apply to a situation where the apertures are progressively decreasing as, for example, on the closing portion of the blade cycle.

In the above arrangement, the output of the range finder is recorded by a linear or fixed pulse rate, also linearly related to distance. Likewise, the blade position sensor 21A provides essentially a linear pulse count representative of blade position. However, the aperture values formed as the blades scan are related to blade position in a non-linear fashion, and the memory 10A provides means for converting the linear subject distance count or measurement to a blade position count providing an appropriate aperture value for flash, it being understood that the selected aperture value, and the blade position representative thereof, can be modified depending upon the amount of ambient light and whether an electronic or incandescent flash is employed.

Other arrangements for converting between the range count (or pulse train) and the position count can be utilized. For example, the range pulse train may be scaled to accomodate the non-linear aperture function so that the range count becomes numerically equivalent to the appropriate blade position count, as later explained in detail in regard to FIG. 6. The blade count itself could alternatively be scaled to provide such conversion, and while the latter may be provided electronically similar to that to be described in FIG. 6, it is preferable to employ the blades themselves in a scaling fashion to provide a blade count linearly related to the flash fire aperture value function as later explained with regard to FIG. 8.

A second embodiment of the present invention is shown in FIG. 6 to which reference is now made. In this embodiment, the position/distance converter is a scaled clock rather than a digital memory. In response to a manual input at 20B (see FIG. 8), acoustic ranging device 19B transmits an ultrasonic burst towards subject 16B. Coincident with the transmission of the burst, a fixed rate clock 60 is started, and the pulses produced by this clock are applied to accumulator 61 which serves to total the pulses. The clock 61 is also applied to programmed divider 62 which, in response to decoder 63, will at specific counts increase the pulse rate passing to the counter 64 to thereby produce what is termed herein a "scaled clock" in the same manner that similar structure in U.S. Pat. No. 4,199,244 produces a scaled clock. The output of divider 62 is accumulated in counter 64 whose contents at any instant constitute the fire-flash position of scanning shutter 11B.

Figure 7:
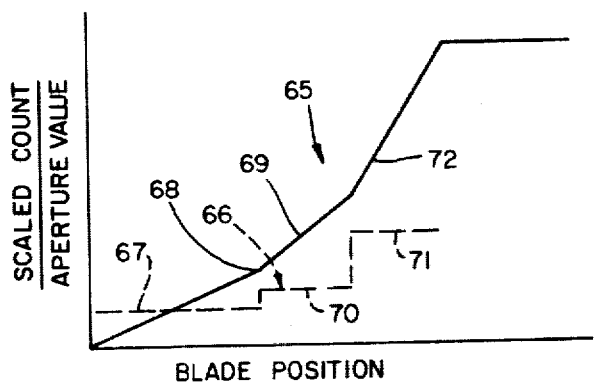
FIG. 7 is a graph illustrating the operation of the position/distance converter of FIG. 6.
Figure 9:
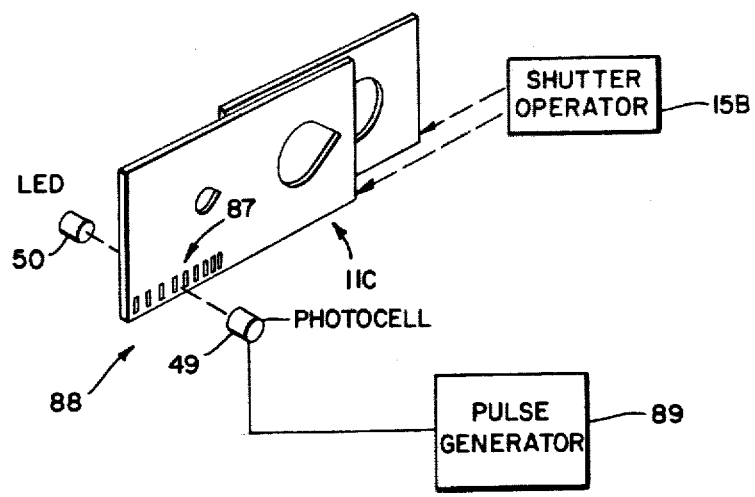
FIG. 9 is a perspective view of the scanning shutter utilized with the device shown in FIG. 8.

FIG. 7 illustrates schematically the method of operation of converter 23B. Curve 65 represents the fire-flash response characteristic curve of shutter 11B after piecewise smoothing of the curve. For purposes of illustration, the curve is smoothed to only three straight sections; however, in practice a somewhat larger number is desirable so as to more closely approximate the actual curve. To accomodate the difference in slope of each section, the scaled clock provides a different pulse rate during successive periods of the ranging time. Thus, to provide numerical equivalence between the range count and the blade position count, where the aperture value versus the latter is less than the squared relation, the count stored in counter 62, designated by dotted line 66, is at a first rate designated at 67 until a count is reached which represents the first breakpoint 68 in the curve 65.

From the first to the second breakpoint in curve 65, divider 62 is then effective to produce pulses at a pulse rate 70 proportional to the slope of the second section 69 of curve 65, and a third rate 71 for the third section 72. In this regard, the decoder 63 stores the trip count which switches the pass through rate of divider 62 so that the selected count rate is delivered to counter 64.

In this manner, the output of divider 62 is a train of pulses having periods in which the repetition rate is different from that of other periods. Thus the pulse repetition rate of the range system is stepped so as to be approximately related to the changes in slope of the characteristic aperture curve of the shutter. The accumulation of pulses in counter 64 effectively relates the range count or pulse train by means of the preprogrammed time-variable pulse repetition rate, to the blade mechanism pulse count so that the range count is representative of the specific position of the blades at which an appropriate aperture value is provided for the flash. Thus, the desired aperture value is a non-linear function of subject range, and the rate of generating range pulses is varied in accordance with the time derivative of at least an approximation of this nonlinear function. Of course, at increased cost, the range pulse train could be continuously scaled to duplicate the precise aperture courve.

When an echo is received by device 19B, the device triggers shutter operator 15B which releases the shutter and strobes counter 64 into preset count 24B which constitutes the coincidence detector for this embodiment of the invention. Thus, upon receipt of an echo, preset counter 24 will contain the selected blade position or count as the shutter begins to move. Then, as in the embodiment illustrated in FIG. 5, a slit detector 74 by means of a pulse generator 21A produces a pulse train which, in turn, counts down the preset counter 24B. When the latter reaches zero, its output signal $\phi$ is generated to fire the flash and initiate shutter closing.

The scaled clock arrangement can also be utilized without the digital feedback from the blades. For example, the scaled clock can provide a count related to the aperture value versus blade scanning time. Then, only first light is actually detected and a fixed rate clock is employed to count down the flash preset counter 24B so as to fire the flash at an appropriate aperture as selected in accordance with blade scanning time.

A still further embodiment of the present invention is shown in FIG. 8 wherein the scaled pulse train is developed by blade movement. Referring now to FIG. 11, manual input 20C causes acoustic ranging device 19C to transmit an ultrasonic burst towards a subject (not shown). Simultaneously with the transmission of the ultrasonic burst, clock 85 is started producing a uniform train of pulses which are accumulated in accumulator 86. The contents of accumulator 86 is a number representative of the instantaneous range of the subject during the ranging operation of device 19C. Upon receipt of an echo by device 19C, the output thereof is used to trigger shutter operator 15C for the purpose of actuating scanning shutter 11C, and to strobe the contents of accumulator 86 into presettable register or counter 87. Thus, the contents of counter 87 will be representative of the actual range of the subject being photographed.

Scanning shutter 11C is similar to shutter 11A except that the apertures or slits 87 in scanning shutter 11C are non-uniformly spaced in a manner that provides information related to the aperture value provided at each position of the blades. Optical detector 88 detects the passage of the unequally spaced slits causing pulse generator 89 to develop a train of pulses at a repetition rate determined by the spacing of the slits. The pulses produced by pulse generator 89 are used to decrement presettable counter 87 which produces an output when the contents of counter 87 reach zero thereby firing flash 13C. In this embodiment the integrated output of pulse generator 89 (i.e., the accumulation of the pulses generated thereby) constitutes the fire-flash characteristics of the scanning shutter. Hence in this embodiment, the spacing of the blade slits is varied in accordance with the function of the aperture value versus subject distance to provide blade position indicators or a blade pulse train directly related to the linear pulse count of subject distance.

It should be noted that while the latter embodiments are also described with regard to the flash aperture employed under low ambient light conditions, the ambient light may be factored into the system. For example, the ambient light level may be sensed in a conventional manner just before or during the initial stages of exposure and the stored count derived from subject distance or the position count added to or subtracted from in order to shift the selected flash fire aperture.

It is believed that the advantages and improved results furnished by the method and apparatus of the present invention are apparent from the foregoing description of the preferred embodiments of the invention. Various changes and modifications may be made without departing from the spirit and scope of the invention as described in the claims that follow.

What is claimed is:

1. Apparatus for actuating a flash unit on a camera that includes a scanning shutter having displaceable apertured blades which upon displacement establish a varying exposure aperture, ranging means for producing an output representative of the distance from the flash unit to a subject being photographed, and means for actuating the shutter to displace the blades, said apparatus comprising:

blade position sensing means responsive to displacement of the blades in said one direction for producing an output representative of the instantaneous position of the blades; and flash actuating means for triggering the flash unit to produce a pulse of light in response to both the output of the ranging means and the blade position sensing means so as to produce said light pulse at an aperture functionally related to subject distance, said flash actuating means including a position/distance converter responsive to the output of the ranging means for producing a representation of the fire-flash position of the blades in accordance with a predetermined relationship between aperture value and subject distance for proper exposure of the subject, and coincidence detection means responsive to the output of the blade position sensing means and to the representation of the fire-flash position of the blades for actuating the flash unit when the blades reach said fire-flash position, said position/distance converter including:

a digital memory whose contents, at a given address corresponding to a given subject distance, represents the fire-flash position of the blades for a subject at the given distance;

addressing means responsive to the output of the ranging means for addressing the digital memory;

a presettable counter; and means for reading the contents of the memory at the address specified by the output of the ranging means into the presettable counter whose contents represent the fire-flash position of the blades corresponding to the distance of the subject as represented by the output of the ranging means.

2. Apparatus according to claim 1 wherein the output of the blade position sensor is applied to a pulse generator for generating a train of pulses whose accumulated value, at any instant, is representative of the instantaneous position of blades, and means for applying the train of pulses to the presettable counter for decrementing the same, the presettable counter producing an output, when the contents thereof reaches a predetermined value, for actuating the flash unit.

3. Apparatus according to claim 1 wherein the output of the blade position sensor is applied to a pulse generator for generating a train of pulses and the apparatus includes an accumulator for accumulating the train of pulses, the contents of the accumulator at any instant being representative of the instantaneous position of the blades, and a comparator for comparing the contents of the presettable counter with the countents of the accumulator for producing an output when the contents are the same, the output of the comparator being effective to actuate the flash unit.

4. Apparatus according to claim 1 wherein the blade position sensor includes slits in at least one of the blades and an optical detector associated with slits for detecting displacement of the blades relative to the detector and converting such displacement into a train of pulses whose accumulated total at any instant is representative of the instantaneous position of the blades.

5. Apparatus according to claim 1 wherein the ranging means is constructed and arranged to transmit an ultrasonic burst in response to a manual input and to receive an echo from the subject, and including a clock, an accumulator for accumulating clock pulses in response to transmission of an ultrasonic burst, a parallel entry register into which the contents of the accumulator is strobed upon receipt of an echo whereby the contents of the parallel entry register is representative of the subject distance, the addressing means being responsive to the contents of the parallel entry register for addressing the memory, and means for strobing the contents of the addressed register in the memory into the presettable counter in response to receipt of an echo from the subject.

6. Apparatus for actuating a flash unit on a camera that includes a scanning shutter having displaceable apertured blades which upon displacement establish a varying exposure aperture, ranging means for producing an output representative of the distance from the flash unit to a subject being photographed, the ranging means producing a first pulse train linearly related to distance, and means for actuating the shutter to displace the blades, said apparatus comprising:
blade position sensing means responsive to displacement of the blades in said one direction for producing an output representative of the instantaneous position of the blades; and
flash actuating means for triggering the flash unit to produce a pulse of light in response to both the output of the ranging means and the blade position sensing means so as to produce said light pulse at an aperture functionally related to subject distance, said flash actuating means including a position/distance converter responsive to the output of the ranging means for producing a representation of the fire-flash position of the blades in accordance with a predetermined relationship between aperture and subject distance for proper exposure of the subject, and coincidence detection means responsive to the output of the blade position sensing means and to the representation of the fire-flash position of the blades for actuating the flash unit when the blades reach said fire-flash position, said position/distance converter including a scaled clock responsive to said first pulse train for generating a train of pulses having a nonuniform pulse repetition rate functionally related to the slope of the fire-flash characteristic curve for the shutter, and further including an accumulator for accumulating the phases from said scaled clock.

7. Apparatus according to claim 1 wherein the output of the blade position sensor is applied to a pulse generator for generating a train of position pulses, and means for applying the train of position pulses to said accumulator for decrementing the same, said accumulator producing an output when the contents reaches a predetermined value for actuating the flash unit.

8. Apparatus for actuating a flash unit on a camera that includes a scanning shutter having displaceable apertured blades which upon displacement establish a varying exposure aperture, ranging means for producing an output representative of the distance from the flash unit to a subject being photographed, and means for actuating the shutter to displace the blades, said apparatus comprising:
blade position sensing means responsive to displacement of the blades in said one direction for producing an output representative of the instantaneous position of the blades; and
flash actuating means for triggering the flash unit to produce a pulse of light in response to both the output of the ranging means and the blade position sensing means so as to produce said light pulse at an aperture functionally related to subject distance, said flash actuating means including a position/distance converter responsive to the output of the ranging means for producing a representation of the fire-flash position of the blades in accordance with a predetermined relationship between aperture value and subject distance for proper exposure of the subject, and coincidence detection means responsive to the output of the blade position sensing means and to the representation of the fire-flash position of the blades for actuating the flash unit when the blades reach said fire-flash position, said position/distance converter comprising the blade position sensing means including a plurality of nonuniformly spaced indicia on at least one of the blades and means operatively associated with the indicia for converting displacement of the blades into a pulse train, the indicia being spaced along the blade to produce a pulse train output varying in accordance with a predetermined relationship between the blade aperture value and subject distance.

9. The camera of claim 8 wherein said indicia are spaced along said one blade in a non-linear arrangement to provide a direct relationship between the resulting blade generated signals and the linear subject distance signal.

10. In a camera for use with a coupled flash unit, the camera having means for directing light along a given path to the camera focal plane, shuttering means operable for unblocking and blocking said given path to provide an exposure interval, said shuttering means including a blade mechanism having at least one blade portion displaceable during operation of said shuttering means for producing progressively varying aperture values over said given path during at least a given portion of said exposure interval in correspondence with incremental displacement of said one blade, detecting means for detecting each progressive position of said one blade, and ranging means for determining the distance from the flash unit to a subject in the scene and for producing a range signal in correspondence thereto, said ranging subject being linearly related to subject distance, the improvement comprising:

comparing means for comparing each progressive blade position with said range signal and for producing a flash trigger signal when said blade position achieves a predetermined value in accordance with said range signal so as to fire the flash at an aperture determined by subject range, and wherein said detecting means provides a position signal representative of each successive predetermined position of said one blade during at least said given portion of the exposure interval, said blade position signal being linearly related to blade displacement, and said comparing means includes means for comparing each position signal with said range signal and for producing said trigger signal when the position signal produces a value representing a flash-fire aperture appropriate for the subject distance in accordance with the non-linear relationship between the desired flash aperture and subject distance, said comparing means including means for converting one of said signals to a converted signal in accordance with the non-linear function relating the desired flash aperture to subject distance so as to provide direct comparison between the converted signal and the remaining signal for production of said trigger signal.

11. The camera of claim 10 wherein said ranging signal is produced as a pulse train whose numerical total is representative of subject distance and said position signal is produced as a pulse train whose numerical total is representative of blade displacement over said given portion of the exposure interval.

12. The camera of claim 11 wherein said converting means includes means for automatically converting the pulse count of one of said signals in accordance with the nonlinear function relating the desired flash aperture to subject distance, and said comparing means directly compares the converted pulse count with the other of said pulse counts.

13. The camera of claim 11 wherein said converting means includes means for scaling one of said pulse trains during its production in accordance with at least an approximation of the non-linear function relating the desired flash-fire aperture value to subject distance.

14. The camera of claim 12 wherein the pulse train produced by said ranging means is automatically scaled.

* * * * *